United States Patent

[11] 3,581,201

[72] Inventors Svyatoslav Anatolievich Kravchenko
Kirovsky Prospekt,65,kv.29;
Alexei Alexeevich Kulemin, Kubinskaya
ul.,28,kv.33, both of Leningrad, U.S.S.R.

[21] Appl. No. 822,407
[22] Filed May 7, 1969
[45] Patented May 25, 1971

[54] PHASE-SETTING DEVICE
4 Claims, 2 Drawing Figs.

[52] U.S. Cl. .......... 324/83, 328/155
[51] Int. Cl. .......... G01r 25/00
[50] Field of Search .......... 324/83 A, 88; 328/155; 323/122

[56] References Cited
UNITED STATES PATENTS
2,987,675 6/1961 Davis .......... 324/88
3,344,358 9/1967 Riker .......... 328/155X

*Primary Examiner*—Alfred E. Smith
*Attorney*—Waters, Roditi, Schwartz & Nissen

ABSTRACT: A phase-setting device for very low, low and high frequencies, comprising phase-shifters, scaling circuits, very low frequency and low frequency mixers, and a variable-frequency oscillator, securing high accuracy of phase-shift setting over a broad range of frequencies from very low to high.

PHASE-SETTING DEVICE

The invention relates to electrical instrumentation, and more specifically to very low and low frequency (VLF-LF) phase-setting devices. Such devices are employed in checking, calibration and certification of phase meters.

The prior a VLF-LF phase-setting device in which the desired phase displacement is controlled by circular phase-shifters in two channels which also include decade attenuators, LF mixers and filters whose signals are supplied at to the output terminals of the device. The inputs of the mixers accept a signal from a frequency box tunable from 300 to 310 kHz. The phase shifters operate at a fixed frequency of 3,000 kHz. per second supplied by a crystal-controlled oscillator.

A disadvantage of this device is that it has a narrow frequency range (0.01 cycle to 10 kilocycles) which does not encompass the whole of the low frequency region. Another disadvantage is a low phase accuracy (1° to 1.5°).

It is, therefore, an object of the present invention to provide a phase-setting device free from the above-mentioned disadvantages.

A particular object of the invention is to provide a phase-setting device for an extended frequency range from very low to high, which operates with high accuracy.

In accordance with the principles of the present invention, the above objects are accomplished by providing in a VLF-LF phase-setting device comprising a crystal-controlled oscillator having its output connected to two parallel arms being provided with series-connected phase-shifters, scaling circuits and VLF mixers whose inputs accept a signal from a variable-frequency oscillator through another scaling circuit, there are provided, according to the invention, two more channels, a high frequency (HF) channel consisting of a frequency divider connected to the output of the crystal-controlled oscillator and to the inputs of the two phase-shifters, and a low frequency (LF) channel comprising two LF mixers, the first inputs of which are connected to the outputs of the phase-shifters and the second inputs to the variable-frequency oscillator, so that the outputs of the device are the outputs of the VLF mixers, LF mixers and phase-shifters, while the output of the crystal-controlled oscillator is connected to a phase-measuring unit such as an oscilloscope the other input of which is connected through a switch to the outputs of the phase-shifters.

The invention will be best understood from the following description of a preferred embodiment, when read in connection with the accompanying drawings, wherein.

Figure 1:
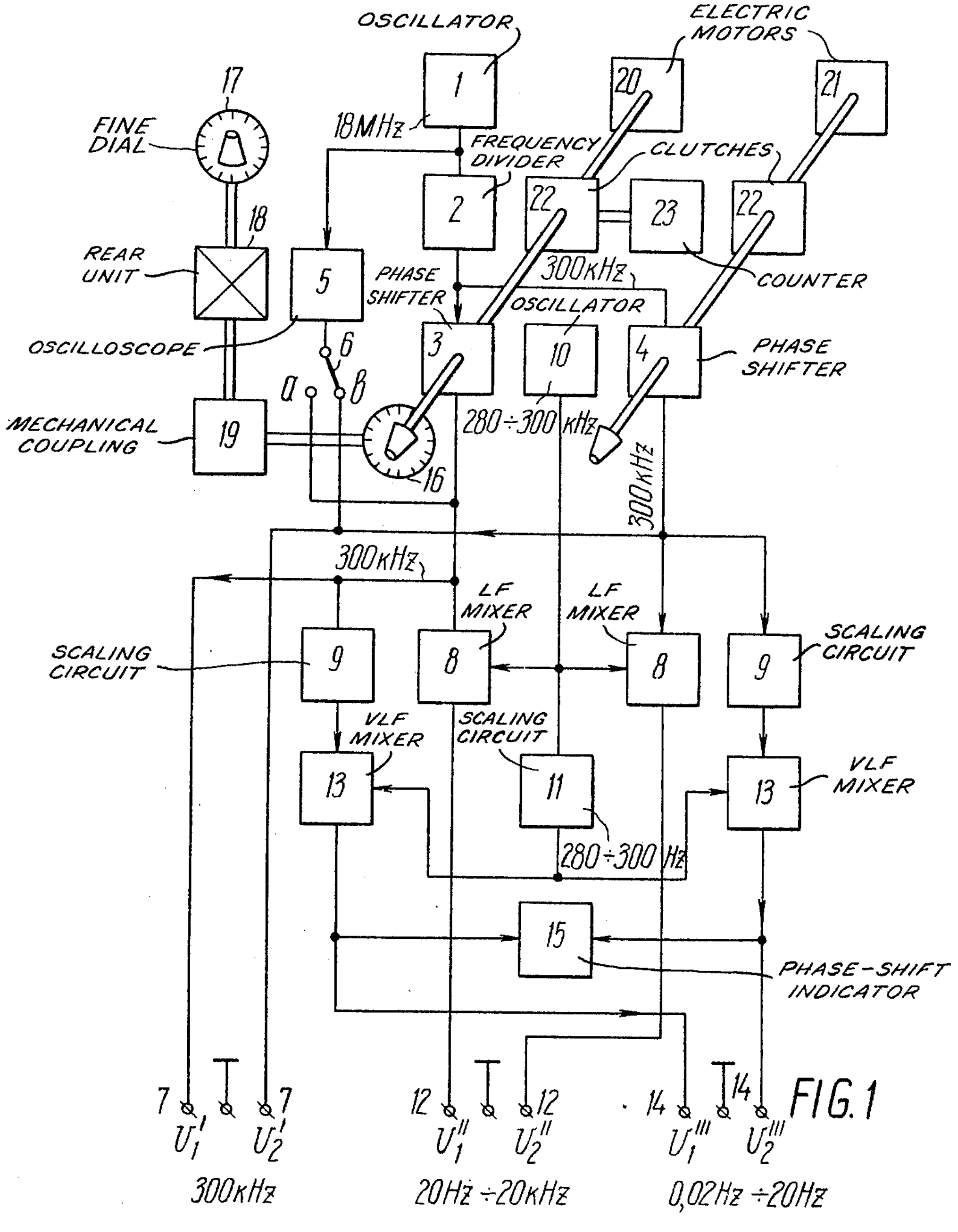
FIG. 1 is a block diagram of a phase-setting device for very low, low and high (VL, L, and H) frequencies, according to the invention.

Referring in particular to FIG. 1, there is a phase-setting device for very low, low and high frequencies, including a crystal-controlled oscillator 1 operating at a high frequency, for instance, 18 MHz., whose output is connected to a frequency divider 2 with a division factor of, for instance, 60, connected to the inputs of a calibrated and an uncalibrated phase-shifter 3 and 4, respectively, and an oscilloscope 5.

The frequency divider 2 may be of any type. In a preferred embodiment, use is made of a regenerative pulse-frequency divider. The output circuits of the frequency divider 2 contain an uncalibrated phase-shifter of any known circuit configuration, so long as it provides for phase-shift adjustment within $\pm 180° n$, where $n$ is the division factor of the frequency divider.

The phase-shifters 3 and 4 may also be of any known circuit configuration providing for a phase shift of 360°. In the same preferred embodiment use is made of static inductive phase-shifters.

The oscilloscope 5 is a cathode-ray variety of any class and circuit configuration, with the vertical deflection system having a frequency bandwidth in excess of that of the crystal-controlled oscillator 1. In the same preferred embodiment the oscilloscope has a bandwidth of 0—25 megacycles.

A two-position switch 6 connects the outputs of the phase-shifters 3 or 4 to the other input of the oscilloscope. Also, the outputs of phase-shifters 3 and 4 are connected to the output terminals 7 which make up the HF output of the phase-setting device, and also to inputs of the LF mixers 8 and to the inputs of scaling circuits (frequency dividers) 9, such as scale-of-1,000 ones.

The LF mixers may have any known circuit configuration, but it is preferable to use conventional ring mixers built around crystal diodes. They keep to a minimum the harmonic content in the output signal, thereby making it possible to use elementary low-pass filters after the mixers.

The second inputs of mixers 8 accept variable-frequency signals from an ordinary variable-frequency oscillator 10, while a similar signal from an oscillator 10 simultaneously is supplied to the input of another scaling circuit 11 with the same scaling factor as that of the scaling circuits 9.

Scaling are meant to denote pulse circuits using flip-flops with feedback, which produce an output pulse whenever a prescribed number of input pulses have been received.

In the general case, the scaling circuits 9 and the scaling circuits 11 differ in that circuits 9 operate at a fixed frequency (300 MHz.), while circuits 11 operate over a fairly broad range of frequencies (280 to 300 kHz.).

The circuits 9 may be similar to the above-described frequency divider 2, since the signal appearing at the output of the circuit 9 should be a sine-wave. The circuit 11 is not a typical frequency divider, since it is to provide a stable frequency division in a continuous frequency band of 280 to 300 kHz., so that a rectangular pulse with a pulse duty factor of one-half is obtained of the output of the circuits 11.

With a view to simplifying the tuning and alignment of the apparatus, the preferred embodiment uses one and the same type of scaling circuits 9 and 11, namely the pulse type. At the output of the scaling circuits 9, however, there are filters tuned to the fundamental frequency of the output signal.

The output signal of the LF mixers 8 is fed through low-pass filters (not shown in FIG. 1) to the terminals 12 which serve as the LF output of the phase-setting device.

The VLF mixers 13 accept the signals from the outputs of the scaling circuits 9 and 11, while the output signals of the mixers 13 are connected through low-pass filters (not shown in FIG. 1) to terminals 14 which serve as the VLF output of the phase-setting device. Also connected across the terminals 14 is a zero-phase-shift indicator 15 which is a two-channel device with a generator in each channel to generate peaked pulses and a coincidence circuit for these pulses.

The coincidence circuit is connected to an indicator to indicate the instant when coincidence occurs. This may be an aural, light, or any other indicator.

The preferred embodiment uses a flashlight phase indicator built around a strobotron.

The calibrated phase-shifter 3 has a coarse dial 16 and a fine dial 17, coupled together through a reduction gear unit 18 and a mechanical coupling 19; the latter makes it possible to link the dials 16 and 17 together or to disengage them, as may be necessary, which is explained later. The phase-shifters 3 and 4 can be rotated by electric motors 20 and 21 through brake clutches 22. The speed of the shaft of the calibrated phase-shifter 3 is indicated by a counter 23.

Figure 2:
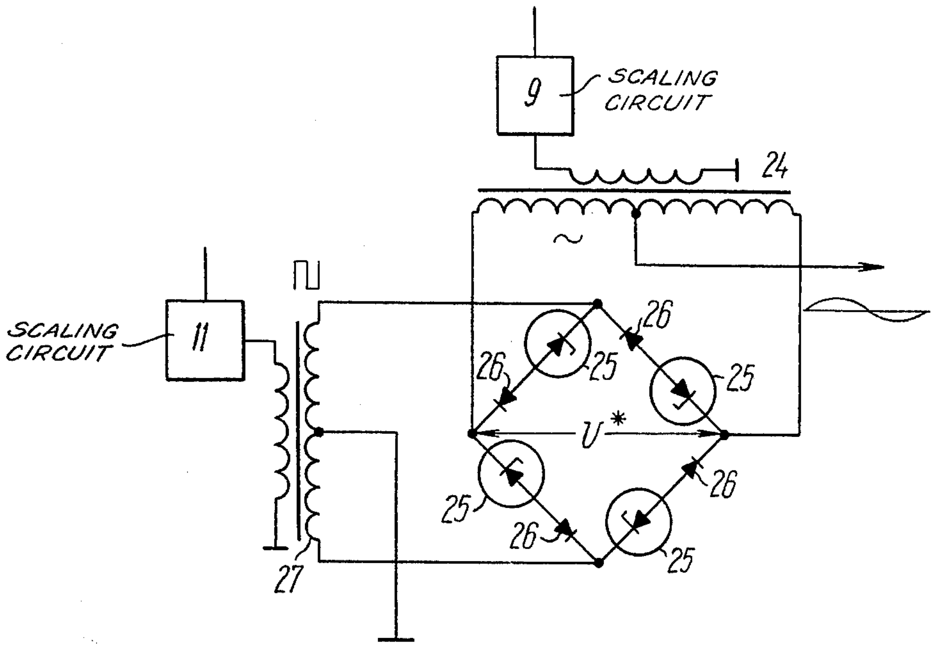
FIG. 2 is a schematic diagram of a very low frequency (VLF) mixer.

FIG. 2 shows a circuit schematic of a VLF mixer.

From the scaling circuit 9, the sine-wave signal at 300 Hz. is fed through a transformer 24 across one pair of opposite junctions of a ring mixer built around Zener diodes 25 and rectifier diodes 26, connected in series in opposition. The other pair of opposite junctions accepts the 1-to-2 rectangular pulses through a transformer 27 from the scaling circuit 11. The frequency of the rectangular pulses is varied from 280 to 300 Hz., so that the signal appearing past the low-pass filters has a frequency of 0.02 to 20 Hz.

The low-pass filter connected to the output of the mixers 13 (FIG. 1) has a cutoff frequency of 60 Hz., in contrast to the low-pass filters past the mixers 8, which have a cutoff frequency of 60 kHz.

Operation of the VLF, LF and HF phase-setting device in a preferred embodiment and in three modes of operation is as follows:

I. HF operation (at a fixed frequency of, say, 300 Hz.).

The clutch 19 is engaged, that is, the dials 16 and 17 are coupled together through the reduction gear unit with a gear ratio equal to the frequency division factor of the frequency divider 2 (for instance, 120); the brake clutches 22 are released so that the electric motors 20 and 21 are disengaged from the phase-shifters 3 and 4. The accuracy of phase-shift indication is enhanced by display of a Lissajous figures with high frequency ratios (for instance, 60:1) on the screen of the oscilloscope to indicate incremental phase shifts. An incremental phase shift is given by.

$\Delta\Phi = 360°/2n = 3°$, where $n = f_{max}/f_{min} = 18$ MHz.300 kHz.=60.

is the frequency ratio, while $f_{max}$ and $f_{min}$ are the frequencies of the signals from the crystal-controlled oscillator 1 and the phase-shifters, respectively.

The dial 16, coupled to the phase-shifter 3, is graduated from zero to 360° in steps of 1° and 3°, while the dial 17 is graduated in 100 divisions in steps of 0.03°.

The zero phase shift is set in two steps:

1. the switch 6 is put in position "*a*." The dials 17 and 16 are set to zero. A closed Lissajous figure is obtained on the screen of the oscilloscope with the phase-shifter adjustable within ±360°/*n* (built into the frequency divider 2 and not shown for the sake of simplicity);
2. the switch 6 is moved to position "*b*." The phase meter under test is connected to the output terminals 7, and the phase-shifter 4 is adjusted until the phase meter gives an approximate zero phase shift. Finally, a precise setting for zero phase shift is obtained by reference to the Lissajous figure.

Since the accuracy of phasemeters is about 1° to 1.5°, their indication of zero phase shift will be in error by exactly that amount. This fact will result in "loose-ended" Lissajous figures on the screen of the oscilloscope 5. They should be closed by small adjustment to the phase-shifter 4.

There can be no confusion between similar positions of the Lissajous figures, because they are displaced by 3° from one another, and this may be noted by any coarse phasemeter.

Next the switch is again set in position "*a*," and any phase-shift from zero to 360° can be obtained in steps of 0.03° by means of the phase-shifter 3 (or, more accurately, by means of the dials 16 and 17).

II. LF operation (in the frequency range from 20 Hz. to 20 kHz.).

The continuous frequency range from 20 Hz. to 20 kHz. is obtained at the terminals 12 connected to the outputs of the mixers 8 which accept the signal from the oscillator 10, varying in frequency from 280 to 300 kHz. The desired phase-shift is set as already described. The accuracy of phase-shift settings is the same as in the HF operation, that is, 0.03°.

III. VLF operation (0.02—20 Hz.).

For greater frequency stability in the VLF region, the scaling circuits 9 and 11 divide the frequency of the signals appearing at the outputs of the phase-shifter 3 and 4 and of the oscillator 10 by a greater number, say, 1,000. The VLF signals are obtained after the filters (not shown) connected to the output of the mixers 13 whose inputs accept sine-wave signals at 300 Hz. and rectangular signals in a variable frequency range of 280 to 300 Hz. It is not difficult to filter a sine-wave signal with a frequency of 300 Hz. so that the distortion factor will not exceed 0.5 percent, and the filter is not shown here for simplicity.

Ordinarily, VLF signals are amplified by DC amplifiers, but their zero drift and pulling appear as spurious VLF signals with frequencies from 0.02 to 0.05 Hz.

As a feature of the present invention, the mixer includes Zener diodes and rectifier diodes. Such a mixer furnishes a VLF signal of a very large amplitude:

$$V'''_{1-2} = (\text{approx.})\ \frac{V^* \leq V_Z}{2}$$

where $V^*$ is the voltage across the transformer 24 (FIG. 2), and $V_Z$ is the stabilization voltage of the Zener diode 25.

The resultant signal contains no DC component, which is advantageous, since it usually introduces a phase error at very low frequencies. An additional advantage of this type of mixer is that since the arms of the mixer are switched into conduction and cutoff by a 1-to-2 rectangular pulse, the waveform of its output signal is solely dependent on the nonlinear distortion in the sine-wave signal applied to the other pair of opposite junctions of the mixer.

As a result, the VLF signals appearing at the outputs of the mixers have a nonlinear distortion of only 0.55 to 0.60 percent.

The requisite phase-shift is set as follows: the brake clutches 22 (FIG. 1) are actuated, the clutch 19 is deactivated, and the dial 17 is thus disengaged. Now the dial 16 becomes a fine scale for very low frequencies, because the phase shift is divided by 1,000 at the output. For example, if the phase-shifters 3 and 4 are turned through 1°, the phase shift at the output is 0.001°, and if they are turned through 360°, the phase shift is 0.36°. In order to obtain a phase shift from zero to 360° at the output of the device, the phase-shifters should complete 100 revolutions. To speed up the operation, use is made of the motors 20 and 21 fitted with brake clutches 22. The motor 20 has a reversible speed counter on its shaft, which acts as the coarse dial of the phase-shifter. The phase-shift angle at the output terminals 14 is defined as $\Phi = 360°m + 1000$, where *m* is the reading of the reversible counter.

In VLF range, the zero phase shift is obtained as follows. The reversible counter 23 is reset, and the dial 16 is set to zero. The motor 21 is turned on, and the phase-shifter 4 is allowed to run until the zero shift indicator 15 operates (its signal may be a tone, a flash of light, etc.). At that instant the brake built into the brake clutch 22 is applied, so that the motor 21 and the phase-shifter 4 are rapidly slowed down. Because of inertia, the phase-shifter 4 overshoots the position corresponding to the zero phase shift. Therefore, it is backed through three or four revolutions by hand until the indicator 15 registers zero phase shift. Now any phase shift zero to 360° can be set in steps of 0.001° by means of the phase-shifter 3, the motor 20 and the counter 23.

The device disclosed herein offers the following advantages a. a wide choice of operating frequencies, including a fixed high frequency, a continuous band of low frequencies (from 20 Hz. to 20 kHz.), and a VLF band (from 0.02 to 20 Hz.);
b. high accuracy of phase-shift setting (0.03° at high and low frequencies and better than 0.03° at very low frequencies;
c. generation of a VLF signal without a DC amplifier, that is, without a DC component in it;
d. generation of a VLF signal of large amplitude and low nonlinear distortion (under 0.5 percent);
e. high frequency stability throughout the range of operating frequencies.

While the invention has been described in connection with a preferred embodiment, it is not intended to be limited to the details shown, since various modifications and adaptations may be made without departing in any way from the spirit and scope of the present invention, which those in the art will readily comprehend.

Therefore, such modifications and adaptations should and are intended to be comprehended within the meaning and range of equivalence of the present invention as set forth in the appended claim.

What we claim is:

1. A phase-setting device for very low and low frequencies, comprising: a crystal-controlled oscillator; a first arm having a phase-shifter, a scaling circuit and a very low frequency mixer; said phase shifter, scaling circuit and very low frequency mixer being connected in series with said phase shifter receiving the output of said oscillator, a second arm containing a series combination of a phase-shifter, a scaling circuit and a very low frequency mixer said phase-shifter in said second arm receiving the output of said oscillator, said second arm being in parallel with the first arm; a variable-frequency oscillator; an additional scaling circuit connected to said variable-frequency oscillator and to the inputs of both of said mixers; a high frequency channel having a frequency divider connected to the output of said crystal-controlled oscillator and to the inputs of both of said phase-shifters; a low frequency channel containing two low frequency mixers each of said two low frequency mixers being connected to the output of a respective one of said phase-shifters and to the output of said variable-frequency oscillator; an oscilloscope, one input of said oscilloscope being connected to the output of said crystal-controlled oscillator and an other input of said oscilloscope being connected to the outputs of both of said phase-shifters, said oscilloscope serving as a phase indicator.

2. A phase-setting device as claimed in claim 1, wherein said very low frequency mixers each include a bridge network including four branches, each of said branches being provided with a Zener diode and a diode connected in series, the polarities of said Zener diode and said diode forming each of said branches being opposite.

3. A phase-setting device as claimed in claim 1, including a manual coarse dial and a manual fine dial for adjusting the phase shift in said phase-shifters.

4. A phase-setting device as claimed in claim 3, including a reduction gear unit wherein said coarse and said fine dials are mechanically coupled through said reduction gear unit, the gear ratio of said unit being equal to the division factor of said frequency divider.